US012623721B2

(12) United States Patent
Kubitza et al.

(10) Patent No.: US 12,623,721 B2
(45) Date of Patent: May 12, 2026

(54) METHOD FOR PROJECTING A GUIDE LINE ONTO A ROAD SURFACE

(71) Applicant: Hella GmbH & Co. KGaA, Lippstadt (DE)

(72) Inventors: Boris Kubitza, Möhnesee-Körbecke (DE); Jeremias Spiegel, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 122 days.

(21) Appl. No.: 18/543,578

(22) Filed: Dec. 18, 2023

(65) Prior Publication Data

US 2024/0116570 A1      Apr. 11, 2024

Related U.S. Application Data

(63) Continuation of application No. PCT/EP2022/065188, filed on Jun. 3, 2022.

(30) Foreign Application Priority Data

Jun. 23, 2021    (DE) ..................... 10 2021 116 230.0

(51) Int. Cl.
*B62D 15/02*        (2006.01)
*B60Q 1/14*        (2006.01)

(52) U.S. Cl.
CPC ............. *B62D 15/029* (2013.01); *B60Q 1/14* (2013.01); *B60Q 2300/322* (2013.01)

(58) Field of Classification Search
CPC ................................................... B62D 15/029
See application file for complete search history.

(56) References Cited

U.S. PATENT DOCUMENTS

| | | | | |
|---|---|---|---|---|
| 6,587,573 | B1 * | 7/2003 | Stam ...................... | B60Q 1/143 |
| | | | | 382/104 |
| 2002/0080617 | A1 * | 6/2002 | Niwa ....................... | B60Q 1/18 |
| | | | | 362/465 |
| 2004/0114379 | A1 * | 6/2004 | Miller .................... | B60Q 1/085 |
| | | | | 362/465 |
| 2015/0354968 | A1 | 12/2015 | Mizuno et al. | |
| 2016/0304120 | A1 | 10/2016 | Okada et al. | |
| 2020/0062169 | A1 * | 2/2020 | Reim ....................... | B60Q 1/10 |

FOREIGN PATENT DOCUMENTS

| | | | |
|---|---|---|---|
| DE | 102009047476 A1 | 6/2011 | |
| DE | 102013215980 A1 | 2/2015 | |
| DE | 102017202549 A1 | 8/2018 | |
| DE | 102018202267 A1 | 8/2019 | |
| EP | 2562038 A1 | 2/2013 | |

(Continued)

*Primary Examiner* — Davetta W Goins
*Assistant Examiner* — Pameshanand Mahase
(74) *Attorney, Agent, or Firm* — Husch Blackwell LLP

(57)        ABSTRACT

A method is provided for projecting a guide line onto a road surface. An anticipated trajectory of the motor vehicle is calculated from the speed and steering angle of the motor vehicle. A guide line is projected onto a road surface in front of the motor vehicle. The guide line indicates the anticipated travel path. Whether the motor vehicle is starting a curve is detected based on the steering angle. The guide line contains the shape of a first clothoid in at least a first segment when it is detected that the motor vehicle is starting to travel in a curve.

15 Claims, 3 Drawing Sheets

(56)             References Cited

FOREIGN PATENT DOCUMENTS

| | | | | |
|----|-----------|------|---------|------------|
| EP | 3144184   | A1   | 3/2017  | |
| EP | 3421314   | A1   | 1/2019  | |
| EP | 3144184   | B1 * | 12/2020 | ............ B60Q 1/085 |
| JP | 2002052976 | A   | 2/2002  | |
| WO | 2017000812 | A1  | 1/2017  | |

* cited by examiner

Fig. 2

METHOD FOR PROJECTING A GUIDE LINE ONTO A ROAD SURFACE

CROSS REFERENCE

This application claims priority to PCT Application No. PCT/EP2022/065188, filed Jun. 3, 2022, which itself claims priority to German Application No. 10 2021 116230.0, filed Jun. 23, 2021, the entireties of both of which are hereby incorporated by reference.

FIELD OF THE INVENTION

The invention relates to a method for projecting a guide line onto a road surface.

BACKGROUND OF THE INVENTION

WO 2017/100812 A1 discloses the calculation of an anticipated travel path for a motor vehicle and projection of guide lines onto the road surface in front of the motor vehicle. These are intended to help the driver of the motor vehicle stay in the lane, and decide whether a steering maneuver is necessary.

BRIEF SUMMARY OF THE INVENTION

In this respect, the fundamental object of the present invention is to increase driving safety.

In an example embodiment, an anticipated travel path for the motor vehicle is calculated from the speed and steering angle of the motor vehicle. This anticipated travel path is understood to be a geometric trajectory corresponding to the anticipated movement of the motor vehicle. The anticipated travel path can be calculated, for example, by assuming that the speed and steering angle will remain constant. The anticipated travel path can also be calculated by assuming that the speed and a change in the steering angle will remain constant. It is also possible to calculate the anticipated travel path by assuming that a change in speed and a change in steering angle will remain constant.

The steering angle is understood in the framework of this description to be a turning of the wheels of the motor vehicle, preferably the front wheels, away from a straight trajectory. When the wheels are not turned, the vehicle travels along a straight path. When the wheels are turned, the vehicle travels along a curved path corresponding to the steering angle of the wheels. As the steering angle increases, the turning radius of the path decreases.

Furthermore, a guide line is projected onto the road surface in front of the motor vehicle. This guide line indicates the anticipated travel path. By way of example, the guide line can correspond to the anticipated travel path.

The projection can be obtained with a motor vehicle headlamp, for example. This headlamp can be a matrix, LED, or LCD headlamp. The direction "forward" is understood in the framework of this description to mean the direction in which the motor vehicle is substantially moving. The motor vehicle can only move at a much slower speed in the opposite direction, "reverse," if at all, because of the transmission used in the motor vehicle.

It is detected whether the motor vehicle has started to travel along a curved path based on the steering angle. If it has been detected that the motor vehicle has begun a curve, the guide line follows a first clothoid in at least a first segment. This can be obtained by taking the start of the curved path into account in the calculation of the anticipated travel path. Instead of assuming that the steering angle remains constant in this calculation, it can be assumed that the steering angle changes constantly during a first time interval.

Because of the effects of perspective, which result in a strong foreshortening of the guide lines for the driver in the direction of travel, the driver would see a kink where the straight line transitions into an arc segment. This can result in the driver assuming that the transition is more abrupt than it actually is, and thus oversteering.

The clothoid in the first segment of the guide line is of particular advantage in increasing driving safety. Prior to starting the curve, the guide line is straight. Once the start of the curve has been detected, the first clothoid is only very slightly curved initially, and this curve increases as it progresses away from the motor vehicle and the motor vehicle moves along the guide line. As a result, the driver no longer sees a kink in the guide line, and is able to gauge the steering angle more accurately. This reduces the risk of the driver oversteering due to a misrepresentation of the curvature with the guide line.

According to one embodiment of the invention, the start of a curve by the motor vehicle can be detected if the steering angle exceeds a threshold value after first travelling a distance with a steering angle below the threshold valve. This results in a particularly reliable detection of the start of a curve. The threshold value can be selected such that slight corrections of the steering angle when traveling in a straight line do not exceed the threshold valve.

According to one embodiment of the invention, the first distance travelled is at least 10 meters. This is also advantageous in obtaining a particularly reliable detection of the start of a curve.

According to one embodiment of the invention, the start of a curve by the motor vehicle can be detected if the steering angle increases continuously. This can be a supplementary operation in particular. By way of example, the start of a curve by the motor vehicle can be detected if the steering angle exceeds the threshold value, and the steering angle increases continuously. This is understood in the framework of this description to mean that the steering angle increases over a specific time period, without remaining constant or decreasing intermittently. The extent of the change in each time period does not have to remain constant, but can also fluctuate.

According to one embodiment of the invention, the start of a curve by the motor vehicle can be detected if the steering angle increases at a steady rate. This can also involve a supplementary operation. In this case, the extent of the change is constant in each time period.

According to one embodiment of the invention, the start of a curve by the motor vehicle can be detected if the steering angle increases constantly and potentially also at a steady rate, after exceeding the threshold valve.

According to one embodiment of the invention, the curvature of the first clothoid increases starting from the motor vehicle. An increase in curvature is understood in the framework of this description to mean that the radius of the curvature decreases.

According to one embodiment of the invention, the first clothoid can be calculated constantly as a function of the steering angle. In this manner, the shape of the guide line corresponds to the movement of the motor vehicle particularly well.

According to one embodiment of the invention, the guide line can follow a second clothoid, at least in a second segment, if it has been detected that the motor vehicle is completing the curve. As with the first segment, there are advantages here that are obtained with regard to the perspective effects in the perception of the guide line by the driver.

According to one embodiment of the invention, the curvature of the second clothoid can decrease starting from the motor vehicle.

According to one embodiment of the invention, the second clothoid can be constantly calculated as a function of the steering angle.

According to one embodiment of the invention, the completion of the curve by the motor vehicle can be detected if the steering angle decreases continuously and at a steady rate, for example.

According to one embodiment of the invention, the guide line can have a constant curvature if the steering angle remains constant after starting the curve. A tolerance value can be established in particular, such that slight changes in the steering angle are not taken into account. In this embodiment, the guide line can have the shape of the first clothoid in the first segment. Subsequently, when the steering angle remains constant, the guide line can exhibit a constant curvature, and therefore form an arc segment of a circle. In the subsequent, second segment, the guide line can then have the shape of the second clothoid, as the curve is completed.

This embodiment is particularly advantageous because at both the start and the end of the curve, the driver sees a guide line without the kinks that would be seen in the transition from a straight line to a curved line with a constant curvature, and back to the straight line.

The control unit may comprise a digital memory and a processor. Instructions are stored in the digital memory with which the processor executes the method according to one of the embodiments of the invention when the processor executes the instructions. This processor can control a motor vehicle headlamp that projects the guide line.

The motor vehicle may contains such a control unit and the headlamp.

BRIEF DESCRIPTION OF THE DRAWINGS

Reference is now made more particularly to the drawings, which illustrate the best presently known mode of carrying out the invention and wherein similar reference characters indicate the same parts throughout the views.

FIG. 2 shows a schematic illustration of the curvature of the guide line in FIG. 1 while a motor vehicle travels through a curve.

DETAILED DESCRIPTION OF THE DRAWINGS

Figure 1:
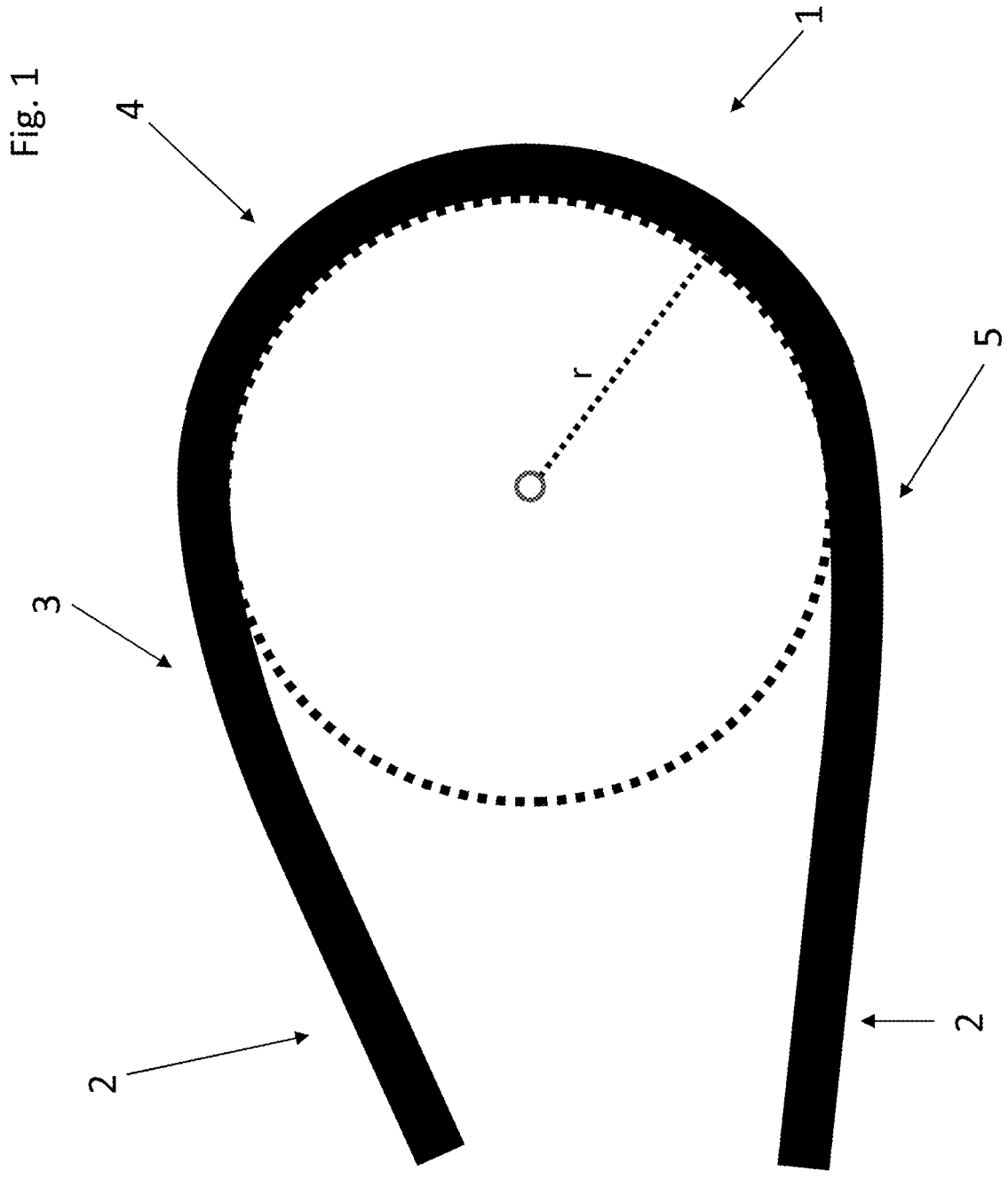
FIG. 1 shows a schematic illustration of a guide line according to one embodiment of the invention.

FIG. 1 shows the guide line 1 that is obtained when a motor vehicle travels through a curve. First, while the motor vehicle travels in a straight line, the guide line 1 is not curved in a straight segment 2. Subsequently, when it has been detected that the curve has begun, the guide line 1 assumes the shape of a clothoid in a first segment 3. The curvature of the first clothoid increases as it progresses away from the straight segment 2. If the steering angle remains constant, the motor vehicle is in the curve, and the guide line has a constant curvature in the intermediate segment 4. This intermediate segment is an arc segment with a constant radius r. In the intermediate segment 4, which is between the first segment 3 and the second segment 5, the guide line is therefore an arc segment of a circle.

After completing the curve, the guide line 1 has the shape of a second clothoid in the second segment 5. The curvature of the second clothoid decreases as the distance to the intermediate segment 4 increases. After the second segment, when the curve is completed, the guide line 1 straightens back out into a straight segment 2.

It should be noted that most of the time, the driver is unable to see the entire guide line at once. At the start of the curve, the radius of the arc segment 4 remains unknown, for example. Moreover, most headlamps are unable to project the entire shape shown in FIG. 1 at once. The shape shown in FIG. 1 is only obtained by reconstructing the guide line from the segments at various points in time while travelling through the curve.

The guide line 1 is of particular advantage at the start and end of the curve, because it helps the driver accurately gauge the steering angle. The clothoid shapes in the first segment 3 and in the second segment 5 ensure that the driver does not see a kink in the guide line 1 in the transitions from travelling in a straight line to entering a curve, and from completing the curve back to travelling in a straight line.

Figure 2:
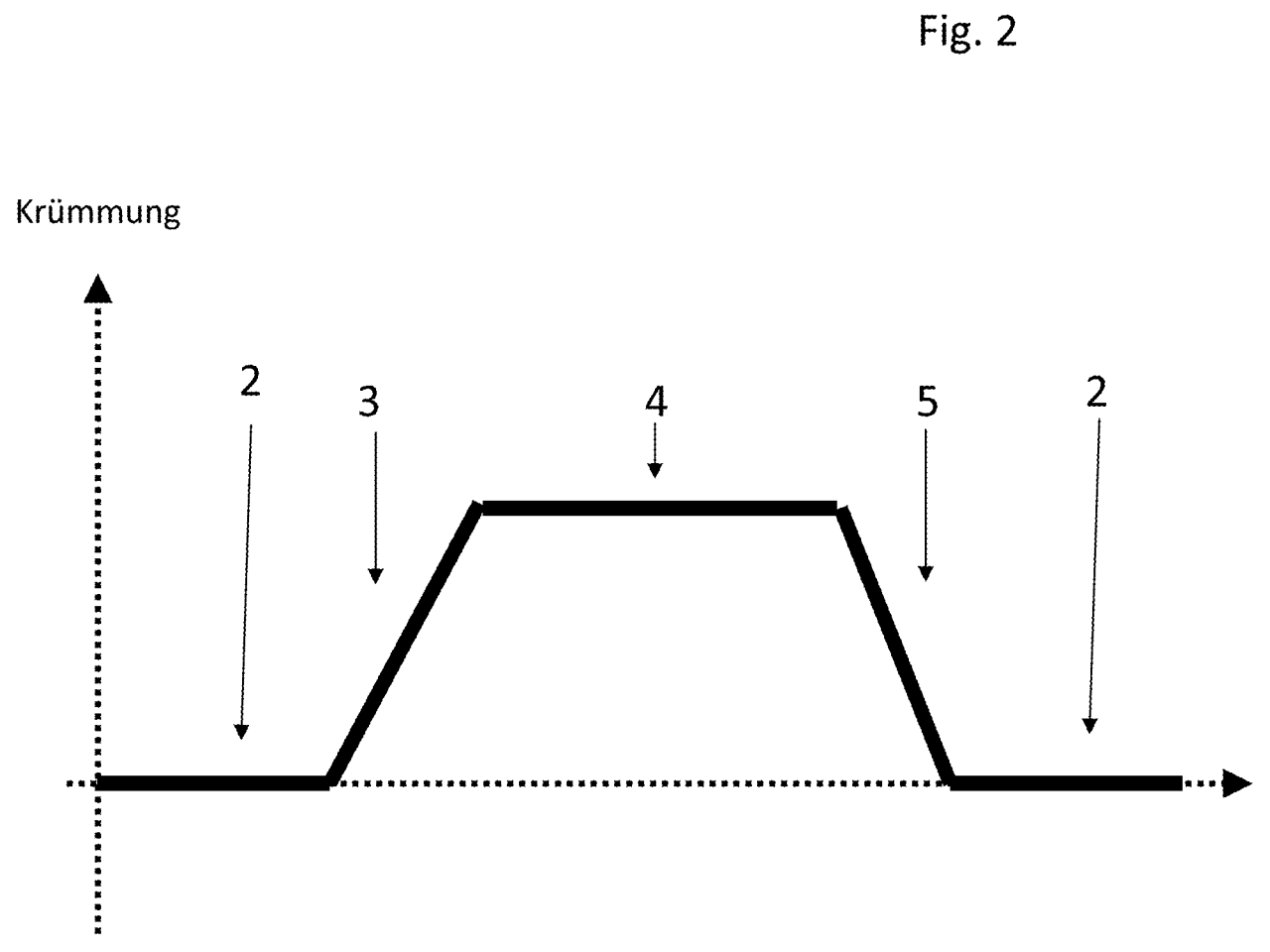

The shape of the guide line during the curve is also illustrated in FIG. 2. The guide line is not curved in the straight segment 2. The curvature of the guide line increases continuously and at a steady rate in the subsequent first segment 3. This is followed by the intermediate segment 4, in which the curvature remains constant, and the corresponds to the highest value in the first segment 3. The second segment 5 follows the intermediate segment 4, in which the curvature decreases continuously and at a constant rate, starting from the curvature of the intermediate segment 4, until the guide line is no longer curved in the straight segment 2 following the second segment 5.

Figure 3:
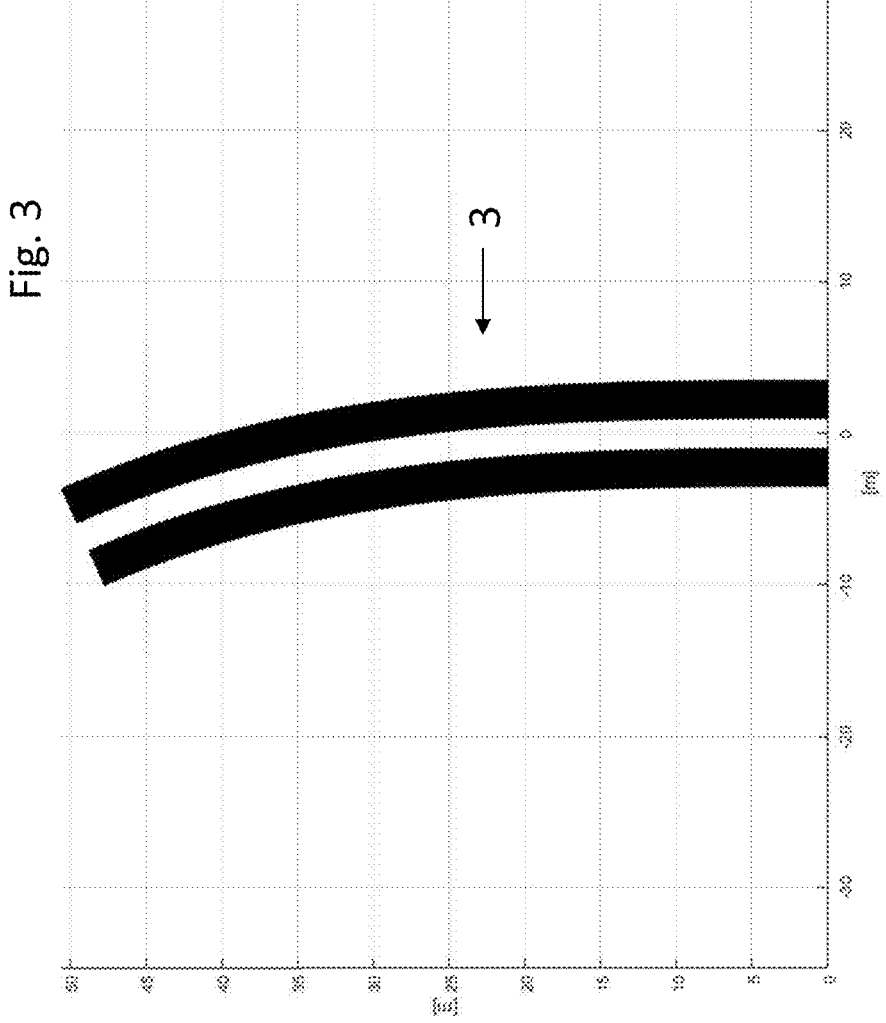
FIG. 3 shows a schematic illustration of the first segment of the guide line.

The first segment 3 is enlarged in FIG. 1. The distance to the motor vehicle is plotted on the y-axis. The x-axis corresponds to the horizontal transverse direction of the motor vehicle, which is perpendicular thereto. The guide line is shown a two guide lines with two separate parallel lines, because this is also one way of showing the guide line. FIG. 3 illustrates in particular that the first segment 3 is only slightly curved where it is close to the motor vehicle, and first becomes noticeably curved at a distance of approx. 20 meters to the vehicle, at the start of a curve.

Because of the smooth transition from the straight segment to the first segment 3, the driver can accurately gauge the steering angle, such that the risk of irritation caused by the guide line is reduced.

LIST OF REFERENCE SYMBOLS

1 guide line
2 straight segment
3 first segment
4 intermediate segment
5 second segment

The invention claimed is:
1. A method for projecting a guide line onto a road surface, the method comprising:
    calculating an anticipated trajectory of a motor vehicle from a speed and a steering angle of the motor vehicle;
    projecting the guide line onto the road surface in front of the motor vehicle, wherein the guide line indicates the anticipated trajectory; and

detecting that the motor vehicle is starting to travel in a curved path when the steering angle exceeds a threshold value;

wherein the guide line contains a shape of a first clothoid in at least a first segment upon detecting that the motor vehicle is starting to travel in the curved path.

2. The method according to claim 1, wherein a start of the curved path to be travelled by the motor vehicle is detected when the steering angle exceeds the threshold value after travelling a first distance with a steering angle that is lower than the threshold value.

3. The method according to claim 2, wherein the first distance is at least 10 meters.

4. The method according to claim 1, wherein a start of a curved path to be travelled by the motor vehicle is detected when the steering angle exceeds the threshold value and when the steering angle increases continuously.

5. The method according to claim 1, wherein a start of the curved path to be travelled by the motor vehicle is detected when the steering angle exceeds the threshold value and when the steering angle increases at a steady rate.

6. The method according to claim 1, wherein a start of the curved path to be travelled by the motor vehicle is detected when the steering angle increases continuously over a pre-defined time period after exceeding the threshold value.

7. The method according to claim 1, wherein a curvature of the first clothoid increases starting from the motor vehicle.

8. The method according to claim 1, wherein the first clothoid is constantly calculated as a function of the steering angle.

9. The method according to claim 1, wherein the guide line has a shape of a second clothoid in at least a second segment, upon detection that the motor vehicle has completed travel along the curved path.

10. The method according to claim 9, wherein a curvature of the second clothoid decreases, starting from the motor vehicle.

11. The method according to claim 9, wherein the second clothoid is constantly calculated as a function of the steering angle.

12. The method according to claim 9, wherein completion of the curved path by the motor vehicle is detected when the steering angle decreases continuously.

13. The method according to claim 1, wherein the guide line has a constant curvature when the steering angle remains constant after starting to travel along the curved path.

14. A control unit for a headlamp in a motor vehicle, the control unit comprising:

a digital memory; and a processor;

wherein instructions are stored in the digital memory with which the processor executes the method according claim 1.

15. A motor vehicle comprising:

the control unit according to claim 14; and a headlamp.

* * * * *